2 Sheets—Sheet 1.
G. P. GORDON.
PRINTING PRESS.
No. 366.
Reissued Apr. 8, 1856.
Fig. B.
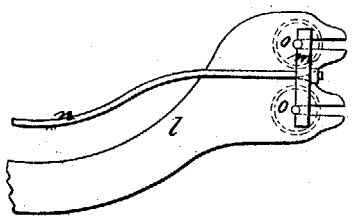
Fig. A.
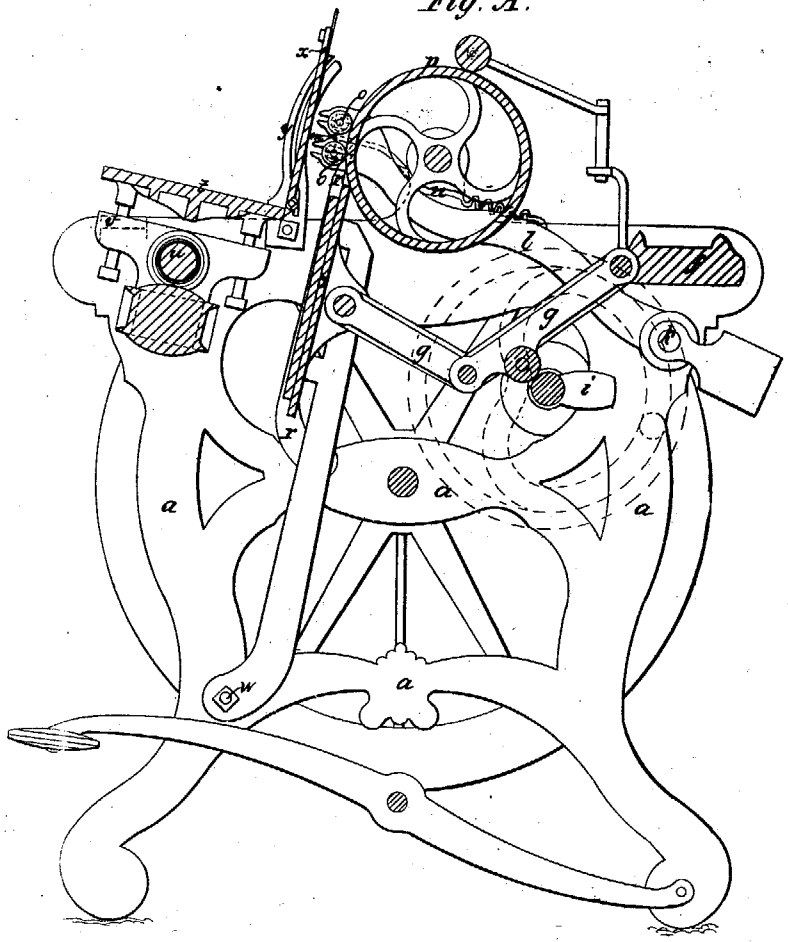

G. P. GORDON.
PRINTING PRESS.
No. 366. Reissued Apr. 8, 1856.
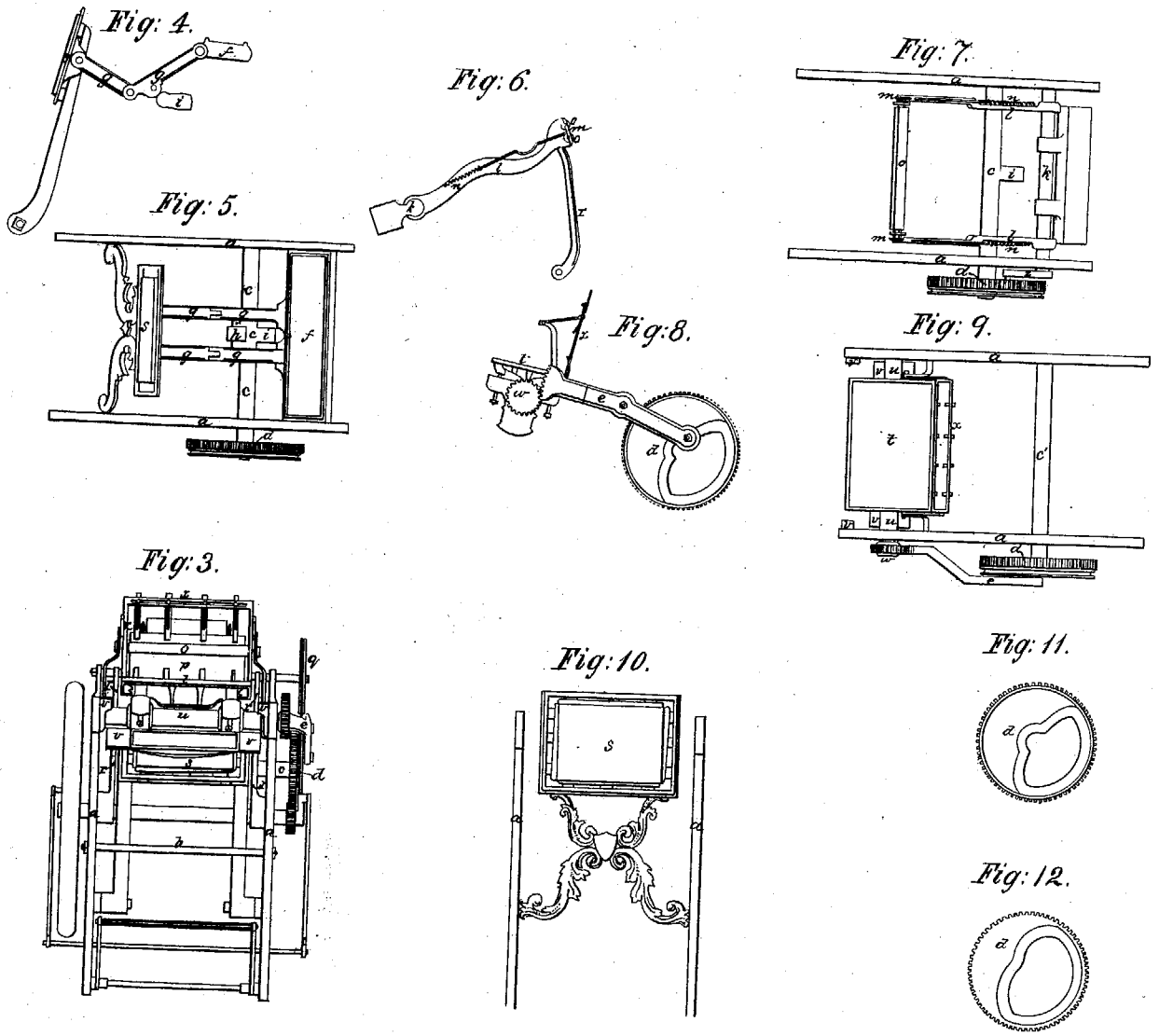

UNITED STATES PATENT OFFICE.

GEORGE P. GORDON, OF NEW YORK, N. Y.

IMPROVEMENT IN PRINTING-PRESSES.

Specification forming part of Letters Patent No. 8,285, dated August 5, 1851; Reissue No. 366, dated April 8, 1856.

*To all whom it may concern:*

Be it known that I, GEORGE P. GORDON, of the city, county, and State of New York, have invented a new and Improved Job-Printing Press; and I do hereby declare that the following is a full, clear, and exact description of the same, reference being had to the annexed drawings, making a part of this specification, in which—

Figure A, Sheet 1, is a longitudinal section of the machine, showing parts which could not be represented without interior section. Fig. B, Sheet 1, is represented to show the method of holding the rollers in the arms. Fig. 3, Sheet 2, is a front view of my improvement. Figs. 4, 6, and 8 are sections of the same. Figs. 5, 7, and 9 are top views of said sections in the press-frame. Figs. 11 and 12 are relative side views of the cam *d*, and Fig. 10 is a front view of the bed and its standard as I make it.

The same letters of reference designate the same parts of the machine in all the figures of the drawings.

The nature of my invention consists in supporting a platen upon a center or centers placed back of its face line, and giving to such platen a rotating reciprocating motion to and from the type or form, so that said platen may assume a proper position for receiving the sheet to be printed, and a proper position also for the impression to be given, and thus carry the sheet from one of these positions to the other; also, in adapting said platen to receive the sheet of paper between it and a frisket with adjustable nippers, as well as a proper arrangement of bed, inking-rollers, &c., all of which is hereinafter fully described and set forth.

To enable others skilled in the art to make and use my invention, I will next describe its construction and operation.

I provide a frame of suitable shape to receive the several parts properly, consisting of two sides, *a*, which may be bolted together in the usual way—that is, with bolts *b*, having collars, and screwed to receive nuts placed on the side opposite to the collars.

*c* is the main shaft, and gives motion to the whole machine through pulleys or gearing in any of the known methods. Upon the main shaft is a revolving cam, *d*, which gives the motion to the platen through a lever, *e*. Near the back end of the frame is a substantial bearing-piece, *f*, firmly attached to the frame, for receiving by joints the extreme end of the toggles. The toggles *g g* are of common construction, and have a friction-roller, *h*, near the center of action for the impression-cam to impinge against. The front end of the toggle is jointed to the back side of the bed. At the center lengthwise of the main shaft is the impression-cam *i*, which gives the impression by impinging against the frictionless roller *h* at the proper time.

Near the back end of the press and beneath the bearing-piece *f* is a rocking shaft, *k*, to which are attached on both sides of the press arms *l*. These arms at the opposite end constitute a frame for holding and carrying the inking-rollers *o* from the distributing-roller *p* to and across the form and back to the distributing-roller each time an impression is taken. The caps *m*, which hold the rollers in place, are connected with two springs, *n*, one extending to either of the arms, for the purpose of keeping said rollers firmly up to the form and the distributing-cylinder at all times, this latter being driven by its pulleys *q* from the pulley on the outside of the impression-cam *d*. On each side of the bed are placed stationary bearers *r*, which bearers keep the roller frame or arms in a steady position while moving, and prevent the rollers from approximating too close to the form—that is, from pressing too hard upon the form. The bed *s* consists of a plate of metal placed upon one of its edges, and vibrates from the point of its receiving the inking-rollers to the impression by means of toggles, and from the impression to its first position by mean of its own gravity. The platen *t* is made to swivel upon a center, *u*, which is placed back of its face line, so that the platen may rotate and reciprocate to a given distance toward and from the form. Thus its face may be brought in contact with the frisket or sheet-holder at the proper time. The opposite side of the center or shaft of the platen is constructed so as to form a counter-balance, and brings up against lugs *v* on the sides of the frame, to prevent the platen from traveling too far in coming to the place of impression. The axle of the platen extends to the outside of the frame, and has upon such extended end a section or segment of a wheel forming part of the arm *e* from the cam *d*. The frisket *x* is a simple frame to pass around and nearly fit the edges of the platen. It is hinged to the lower edge of the platen and has slots through it, so that bolts may be placed to secure the nippers. At its upper or opposite end it has studs to extend into grooved cams *y* (see Fig. A, Sheet 1) on either side of the frame, which cams are so constructed as to give the frisket an upward direction at the same time the platen receives its backward movement. Thus the two open in different directions. The frisket also has upon it adjustable nippers (see Fig. A, Sheet 1, and Fig. 9, Sheet 2) consisting of plain pieces of curved spring with slots in them, and these are attached by bolt and nut to the frame of the frisket, the bolt passing through the slot in the spring-nipper and the slot in the frisket-frame, by which the nipper can be freely moved to accommodate circumstances, and to grip the sheet in any direction and place desired. The driving-gear being ordinary is not here described. The same remark will apply to the inking apparatus. The inking-apparatus arms are set in motion by a crank, *z*, (see Fig. 7,) from the inside cam placed upon the main revolving cam, and this is placed on the driving-shaft.

Operation: Motion being given to the main shaft sets the whole machine in operation. We will suppose the platen to be in the position for the receiving or the giving of the impression, as represented in Figs. 3, 8, 9 of Sheet 2, and Fig. A, Sheet 1. The cam *d* will now begin to act and throw the platen to the vertical position, or the place of receiving the impression. As this has taken place, it will be understood that the sheet was placed in its proper position upon the face of the platen before it moved, and in this movement the frisket has closed upon the sheet, tightly gripping it by the impinging of the nippers upon the sheet as it is laid upon the platen, the frisket having closed upon the platen as it changed its position, the platen carrying the frisket with it to the position for receiving the impression. Immediately on the platen assuming its position, the impression-cam acts upon the toggle and carries the bed forward by straightening the toggle. This takes the impression. The bed then recedes to its first position. The platen next recedes to its first position, and when it is nearly at rest, or clear of the rollers, the inking-rollers commence to descend and pass across the form and back again, and the printed sheet is taken off, when these operations are repeated. Thus it will be understood that about two-thirds of the time of printing a sheet is occupied in inking the form, and that the same time is allowed for taking off one sheet and putting on another, while the remaining one-third of the time is occupied in the movements of the other parts, during which the impression is given. The impression is given by an ordinary toe-cam acting upon a common toggle placed between the movable bed and the stationary brace or bearing-piece *f*, the whole of this acting to cause the bed to advance and recede for the purpose of giving an impression to the sheet, which for the time is at rest upon and with the platen for the purpose of receiving the impression. Immediately the impression is finished and the bed withdrawn, the cam *d* throws the platen over to its horizontal position by means of the lever-segment and the segment on its own shaft, in manner and to the effect hereinbefore described. At this stage the crank *z* sets the inking-roller frame, consisting of the arms *l*, in motion, carrying them down over the form and back, as herein more fully described.

What I claim as my invention, and desire to secure by Letters Patent, is—

1. A rotating reciprocating platen operating substantially as described, for the purpose specified.

2. The arrangement of two side arms so combined as to form a frame to carry the inking-rollers both forward and backward over the form for each impression.

3. Throwing a vibrating bed from the point of its receiving the inking-rollers, as described, directly to the impression by means of toggles, arranged as shown, or in an equivalent way, so that said bed, after receiving the impression, will be allowed to recede or fall back to its original position by its own gravity.

4. The combination of the vibrating bed with the roller-frame, composed substantially as set forth.

5. The grooved cam-shaped guides, or their equivalents, for throwing the frisket, or its equivalent, in the proper direction, and holding it in the desired positions during the intervals of given rest to the platen, for the purpose specified.

GEO. P. GORDON.

Witnesses:
WM. DIXEY,
O. D. MUNN.